(12) United States Patent
Froehling et al.

(10) Patent No.: US 9,963,010 B2
(45) Date of Patent: May 8, 2018

(54) AIR CONDITIONING SYSTEM FOR AN AUTOMOBILE

(71) Applicant: Halla Visteon Climate Control Corp., Daejeon (KR)

(72) Inventors: Joern Froehling, Köln (DE); Karl Schlesinger, Bergheim (DE); Gerald Richter, Aachen (DE); Balthasar Schillemeit, Bonn (DE); Marc Graaf, Krefeld (DE); Frank Schmitz, Bergisch Gladbach (DE); Roberto Della Rovere, Kerpen (DE)

(73) Assignee: HANON SYSTEMS, Daejeon-si (KR)

( * ) Notice: Subject to any disclaimer, the term of this patent is extended or adjusted under 35 U.S.C. 154(b) by 305 days.

(21) Appl. No.: 14/681,126

(22) Filed: Apr. 8, 2015

(65) Prior Publication Data

US 2015/0283876 A1   Oct. 8, 2015

(30) Foreign Application Priority Data

Apr. 8, 2014   (DE) .................. 10 2014 104 969

(51) Int. Cl.
*B60H 1/12*   (2006.01)
*B60H 1/00*   (2006.01)

(52) U.S. Cl.
CPC ..... *B60H 1/00564* (2013.01); *B60H 1/00335* (2013.01); *B60H 1/00899* (2013.01);
(Continued)

(58) Field of Classification Search
CPC .............. B60H 1/00278; B60H 1/0005; B60H 1/00057; B60H 2001/00142; B60H 2001/00107; B60H 2001/00135; B60H 2001/00178; B60H 2001/00942; B60H 2001/00949; B60H 1/12; B60H 1/03; B60H 1/00564

See application file for complete search history.

(56) References Cited

U.S. PATENT DOCUMENTS

| | | | |
|---|---|---|---|
| 5,975,191 A | * | 11/1999 | Ohashi ............... B60H 1/00035 165/43 |
| 6,823,683 B2 | * | 11/2004 | Amaral ............. B60H 1/00907 62/159 |

(Continued)

FOREIGN PATENT DOCUMENTS

| | | | | |
|---|---|---|---|---|
| DE | 3334992 A1 | * | 4/1985 | ........... B60H 3/0085 |
| DE | 19754174 A1 | | 6/1998 | |

(Continued)

*Primary Examiner* — Devon Russell
(74) *Attorney, Agent, or Firm* — Shumaker, Loop & Kendrick, LLP; James D. Miller (57) ABSTRACT

The invention relates to an air conditioning system for conditioning the air of a passenger compartment of a motor vehicle, including an outlet section for diverting at least a portion of an air-mass flow circulating in the air conditioning system into the environment of the motor vehicle, a housing for directing the air-mass flow, wherein at least one fan for conveying the air-mass flow is designed within the housing, as well as a coolant circuit for tempering components of the motor vehicle, in particular, components of a power train, having a coolant-air-heat exchanger for transferring heat from the coolant to an air-mass flow.

16 Claims, 3 Drawing Sheets

(52) U.S. Cl.
CPC .............. *B60H 2001/00178* (2013.01); *B60H 2001/00942* (2013.01); *B60H 2001/00949* (2013.01)

(56) References Cited

U.S. PATENT DOCUMENTS

| | | | | |
|---|---|---|---|---|
| 8,973,387 B2 * | 3/2015 | Osaka | ................ | B60H 1/00021 62/160 |
| 9,346,337 B2 * | 5/2016 | Takahashi | .......... | B60H 1/00921 |
| 9,481,225 B2 * | 11/2016 | Richter | ............. | B60H 1/00057 |
| 2006/0080986 A1 * | 4/2006 | Inoue | ................ | B60H 1/00057 62/259.2 |
| 2009/0020620 A1 * | 1/2009 | Douarre | ............. | B60H 1/00278 237/12.3 R |
| 2009/0193830 A1 * | 8/2009 | Yoshioka | ............ | B60H 1/0005 62/239 |
| 2011/0036117 A1 * | 2/2011 | Frohling | ............ | B60H 1/00028 62/507 |
| 2012/0003510 A1 * | 1/2012 | Eisenhour | ........... | H01M 10/625 429/50 |
| 2013/0299129 A1 * | 11/2013 | Osaka | .................. | B60H 1/0005 165/59 |
| 2014/0075975 A1 * | 3/2014 | Graaf | ................. | B60H 1/00007 62/119 |
| 2016/0152110 A1 * | 6/2016 | Kim | ..................... | B60H 1/0005 165/203 |
| 2017/0158019 A1 * | 6/2017 | Takahashi | .......... | B60H 1/00035 |

FOREIGN PATENT DOCUMENTS

| | | | |
|---|---|---|---|
| DE | 102009028522 A1 | 5/2011 | |
| DE | 102010026101 A1 | 1/2012 | |
| DE | 102010042127 A1 | 4/2012 | |
| DE | 102011052752 A1 | 2/2013 | |
| DE | 102012108891 A1 | 3/2014 | |
| EP | 0913283 A1 | 5/1999 | |
| EP | 2181872 A2 * | 5/2010 | ......... B60H 1/00414 |
| JP | H0840088 A | 2/1996 | |
| JP | 2005053466 A * | 3/2005 | ......... B60H 1/00021 |
| JP | 2008290523 A | 12/2008 | |
| JP | 2012035812 A | 2/2012 | |
| WO | 2012114767 A1 | 8/2012 | |

* cited by examiner

AIR CONDITIONING SYSTEM FOR AN AUTOMOBILE

CROSS-REFERENCE TO RELATED APPLICATIONS

This application claims priority to German Patent Application No. 10 2014 104969.1, filed on Apr. 8, 2014, the disclosure of which is incorporated herein by reference in its entirety.

The invention relates to an air conditioning system for conditioning the air of a passenger compartment of a motor vehicle, including a housing for directing the air-mass flow and a coolant circuit for tempering components, in particular, components of a power train of the motor vehicle. At least one fan for conveying the air-mass flow is designed within the housing. The coolant circuit includes a coolant-air-heat exchanger for transferring heat from the coolant to an air-mass flow.

Air conditioning systems for motor vehicles for conditioning the air to be supplied to a passenger compartment long forming part of the prior art comprise a refrigerant circuit having an evaporator for cooling and a coolant circuit having a coolant-air-heat exchanger for heating the air to be supplied to the passenger compartment. The coolant circuit is also designed with a heal exchanger for transferring heat from the coolant to the ambient air, which is coupled to a fan for conveying the ambient air.

Generic air conditioning systems having heat pumping functionality of the refrigerant circuit are also operated as coolant-air-heat pumps or air-air heat pumps. When employing coolant-air-heat pumps on the one hand, the heat to be transferred to the air being supplied to the passenger compartment is withdrawn from the coolant of the coolant circuit, which discharges the heat, for example, from the engine or other drive elements. In the case of air-air heat pumps on the other hand, the heat is transferred from the ambient air to the refrigerant circulating in the refrigerant circuit.

Air conditioning units for motor vehicles for a combined cooling system operation and heat pump operation for heating, cooling and dehumidifying the air to be conditioned and supplied to the passenger compartment are known in the prior art. The air conditioning units are controlled either on the refrigerant circuit side or on the air side.

A compact air conditioning unit having an evaporator unit, a condenser unit and a component unit as well as a refrigerant circuit is described in DE 10 2009 028 522 A1. The evaporator unit and the condenser unit each include air flow heat exchangers and a fan disposed in one housing. The refrigerant circuit designed for a combined refrigerant unit operation and heat pump operation, as well as for a reheating operation, comprises an evaporator, a condenser and an after-heater. The operating modes of the air conditioning unit are controlled by the refrigerant circuit. The air conditioning unit is operable as an air-air heat pump, which is implemented within the refrigerant circuit by means of an active switching.

A modular vehicle air conditioning unit having heat pump functionality for heating and cooling air is described in DE 10 2011 052 752 A1. The vehicle air conditioning unit includes a housing having a fan and flaps for adjusting air flow paths, as well as a refrigerant circuit having a condenser, an evaporator, a compressor, an expansion member and associated connecting lines. An evaporator air flow path having an integrated evaporator and a condenser air flow path having an integrated condenser are designed in the housing. The two air flow paths are connected to each other via controllable flaps in such a way that a heating or cooling of the passenger compartment occurs only by adjusting the flow path of the air.

Compared to other air conditioning units known in the prior art, a fan is provided for conveying an air-mass flow over the condenser, wherein an additional fan is required for streaming air against a coolant-air-heat exchanger of a coolant circuit.

In addition to the air conditioning systems operable purely as air-air heat pumps, unit having refrigerant circuits are also known, which are designed for utilizing multiple heat sources, such as air and coolant of a coolant circuit. The coolant circuit is used, for example, to temper an internal combustion engine or/and components of an electrical power drive, such as an electric motor, power electronics, battery cells or voltage converters for battery charging management. A water-glycol mixture, for example, is used as a coolant. Disposed within the coolant circuit, also referred to as a low temperature circuit, is a coolant-air-heat exchanger over which ambient air flows. The coolant in this case is cooled to a temperature above the temperature of the ambient air.

In the case of ambient air of a higher temperature, for which there is no adequate possibility of cooling the coolant, the coolant circuit is also designed with a refrigerant-coolant-heat exchanger. In the refrigerant-coolant-heat exchanger, also referred to as a chiller, refrigerant at low pressure level is evaporated and heat from the coolant is transferred from the coolant circuit to the refrigerant in the refrigerant circuit. In this case, the temperature level of the refrigerant in the chiller is significantly below the temperature level of the ambient air. Thus, it is possible to cool the coolant to values below the temperature of the ambient air.

This implementation known from the prior art also offers the possibility of integrating the coolant of the coolant circuit as a heat source in the heat pump mode of the refrigerant circuit, and to utilize the waste heat of the components to be cooled for heating the air to be supplied to the passenger compartment.

DE 10 2010 042 127 A1 discloses a refrigerant circuit of an air conditioning unit for a combined cooling mode and heating mode, as well as for a reheating mode of a motor vehicle, in particular, of a hybrid vehicle. The refrigerant circuit comprises a primary circuit having a compressor, a heat exchanger for transferring heat between the refrigerant and the environment, a first expansion member, a heat exchanger for supplying heat from the incoming air to the passenger compartment to be conditioned to the refrigerant, and a refrigerant-coolant-heat exchanger connected in parallel thereto for transferring heat using components of the power drive of the vehicle. The components of the power train in this configuration are connected to the refrigerant circuit via a coolant circuit. In addition, the refrigerant circuit includes a secondary train having a heat exchanger for transferring heat from the refrigerant to the incoming air to the passenger compartment to be conditioned, as well as a connecting control valve. When operating the air conditioning unit, the ambient air, the incoming air and components of the power train may be used selectively or simultaneously as heat sources and the incoming air as heat sink, depending on the mode.

Unique to the systems known in the prior art is the fact that the heat exchanger of the coolant circuit, in order to transfer heat from the coolant to the ambient air, is coupled to an additional fan for conveying the ambient air, in order to implement and maintain the cooling functions of the coolant circuit when in idle and at low driving speeds.

The air conditioning units designed for an additional reheating operation in particular, also include a complicated refrigerant circuit having a plurality of components, such as a heat exchanger, switching valves and expansion valves, as well as lines, and are therefore burdened with a very complex regulation of the refrigerant circuit.

One object of the present invention is to provide an air conditioning system having heat functionality, in particular for use in motor vehicles. The air conditioning system should only be designed with a minimum number of components and therefore be cost-efficient and low-maintenance.

In such case, the cooling function of the components of the power train in particular, is intended to be maintained and secured with high efficiency. The cooling function is to be integrated in the motor vehicle's existing air conditioning unit. Another object of the present invention is to utilize the heat absorbed from the components of the power train by the coolant circulating in the coolant circuit for heating the air to be supplied to the passenger compartment.

One object is achieved according to the invention by an air conditioning system for conditioning the air of a passenger compartment of a motor vehicle. The air conditioning system has an outlet section for diverting at least a portion of the air-mass flow circulating in the air conditioning system into the environment of the motor vehicle, and a housing for directing the air-mass flow. In this configuration, at least one fan is situated within the housing for conveying the air-mass flow. The air conditioning system further comprises a coolant circuit for tempering components of the motor vehicle, in particular, components of a power train, and a coolant-air-heat exchanger for transferring heat from the coolant to an air-mass flow.

According to the concept of the invention, the coolant-air-heat exchanger is disposed in the outlet section of the air conditioning system, so that an air-mass flow to be diverted into the environment of the motor vehicle flows over the coolant-air-heat exchanger. In the process, the heat from the coolant is transferred to the air-mass flow to be diverted into the environment of the motor vehicle.

By situating the coolant-air-heat exchanger within the outlet section of the air conditioning system, no additional fan is required for streaming air against the coolant-air-heat exchanger.

According to a first alternative embodiment of the invention, the outlet section is integrated as an exhaust air duct formed in the housing. As a flow path for the air, the exhaust air duct may be opened and closed with the aid of an air deflector. The coolant-air-heat exchanger in this configuration is disposed within the exhaust air duct, so that an air-mass flow to be diverted from the housing into the environment of the motor vehicle flows over the coolant-air-heat exchanger.

According to a second alternative embodiment of the invention, the outlet section is designed as an outlet for the air from the passenger compartment. The coolant-air-heat exchanger in this case is disposed within the outlet, so that an air-mass flow to be diverted from the passenger compartment into the environment of the motor vehicle flows over the coolant-air-heat exchanger.

The other object of the invention is also achieved by an air conditioning system according to the invention for conditioning the air of a passenger compartment of a motor vehicle. The air conditioning system has a housing for directing an air-mass flow and a coolant circuit for tempering components of the motor vehicle, in particular, components of a power train. In this configuration, at least one fan for conveying the air-mass flow is disposed within the housing. The coolant circuit is designed with a coolant-air-heat exchanger for transferring heat from the coolant to the air-mass flow.

The coolant-air-heat exchanger is conceived to be arranged within the housing, so that an air-mass flow conveyed within the housing flows over the coolant-air-heat exchanger, and the heat of the coolant is transferred to the air-mass flow. The heat of the coolant to the air in this case may be emitted exclusively to the air-mass flow conveyed within the housing.

Thus, the heat emitted by the coolant may be directly utilized for heating the air to be supplied to the passenger compartment, or the coolant may be utilized as a heat source for components disposed downstream in the flow direction of the air. As a result of the arrangement of the coolant-air-heat exchanger within the housing, in which an air-mass flow is conveyed by a fan, no additional fan is required for streaming air against the coolant-air-heat exchanger.

According to one advantageous embodiment of the invention, the housing includes flow paths, which are designed as a fresh air intake duct or a circulating air intake duct. In this case, fresh air is drawn from the environment through the fresh air intake duct and circulating air is drawn from the passenger compartment through the circulating air intake duct. The coolant-air-heat exchanger is disposed either in the circulating air intake duct or in the fresh air intake duct. According to another alternative, the coolant-air-heat exchanger is disposed downstream from a mixture zone in the flow direction of the intake air-mass flow, into which the fresh air intake duct and the circulating intake duct empty.

Thus, depending on the operating mode, the coolant-air-heat exchanger may be acted upon by fresh air from the environment, with circulating air from the passenger compartment or with a mixture from both.

According to one refinement of the invention, the housing is designed with a first and a second flow duct. In addition, the air conditioning system includes a refrigerant circuit having an evaporator and a condenser. In this case the evaporator is disposed in the first flow duct and the condenser is disposed in the second flow duct.

The air-mass flows, conditioned when flowing through the flow ducts, may be advantageously diverted by way of flow paths into the passenger compartment and/or into the environment of the motor vehicle. In this case, an air deflector and a flow path are preferably designed at the first flow duct downstream from the evaporator in the flow direction of the air, in such a way that an air-mass flow directed through the first flow duct and conditioned is divided into partial air-mass flows, wherein a first partial air-mass flow may be diverted by way of a first flow path into the passenger compartment, and a second air-mass flow may be diverted by way of a second flow path into the environment.

In the arrangement of the coolant-air-heat exchanger within the housing and when over flown by the air-mass flow conveyed within the housing, the heat emitted by the coolant, in addition to directly heating the air to be supplied to the passenger compartment, may also be utilized as a heat source for the refrigerant circuit.

According to another advantageous embodiment of the invention, the air conditioning system is designed for a refrigerant unit operation and a heat pump operation for cooling and for heating, as well as for a reheating operation of the air to be supplied to the passenger compartment.

The evaporator and the condenser of the refrigerant circuit in this case are advantageously always designed to function as evaporator and condenser, regardless of the operating mode. A reciprocal change of the functions of the heat exchanger depending on the operating mode is not required.

Each flow duct may be advantageously acted upon by fresh air from the environment, circulating air from the passenger compartment or a mixture of fresh air and circulating air. The flow ducts are preferably disposed in such a way that the main flow directions of the air within the flow ducts are oriented parallel to each other and point in a common direction. At least the flow directions of the air-mass flow in the direction of the passenger compartment are substantially identical.

According to one refinement of the invention, two fans operable independently of one another are designed within the housing, wherein a first fan conveys an air-mass flow into the first flow duct and a second fan conveys an air-mass flow into the second flow duct.

The coolant circuit advantageously includes means for tempering a drive engine, in particular, an internal combustion engine or an electric motor, a battery, power electronics or voltage converters, or several of these components.

In summary, the solution according to the invention has diverse advantages:
  Integration of the cooling function of the coolant circuit in the air conditioning system for conditioning the air of the passenger compartment, in the process
    elimination of the fan for the coolant-air-heat exchanger and
    utilization of the waste heat of the coolant circuit for heating the air to be supplied to the passenger compartment and as a heat source for a refrigerant circuit,
  reduction of the power required for heating the passenger compartment by circulating air operation and/or by targeted guiding of air within the flow ducts, as well as
  diverting air not needed in the passenger compartment into the environment.

Additional details, features and advantages of the invention emerge from the following description of exemplary embodiments with reference to the associated drawings, in which.

Figure 1:
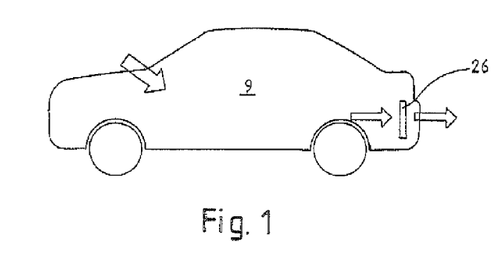
FIG. 1: shows a motor vehicle having a coolant-air-heat exchanger disposed in the mass flow of the exhaust air from the passenger compartment in the area of the extractors,
  an air conditioning system having two flow ducts.

FIG. 1 shows a motor vehicle having a coolant-air-heat exchanger 26 of a coolant circuit (not shown) disposed in the mass flow of the exhaust air from the passenger compartment 9 in the area of the extractors. Extractors in this case are understood to mean ventilation flaps for the air exiting the passenger compartment 9 into the environment.

The coolant circuit designed for tempering components of the power train, such as the internal combustion engine and/or electric motor, power electronics, battery cells or voltage converters for battery management, includes a heat exchanger, the so-called coolant-air-heat exchanger 26, for transferring the heat absorbed, in particular, during cooling of the components from the coolant to the ambient air.

The air conveyed into the passenger compartment 9 with the aid of at least one fan (not shown) is diverted from the passenger compartment 9 into the environment via the extractors disposed in the rear area of the motor vehicle, specifically in the flow direction of the air in front of the rear bumper. The coolant-air-heat exchanger 26 in this case may be positioned in front of or behind the extractors in the flow direction of the air.

Due to the air flow forced by the fan for conveying the air into the passenger compartment 9, it is possible to dispense with an additional fan for streaming air against the coolant-air-heat exchanger 26.

Figure 2:
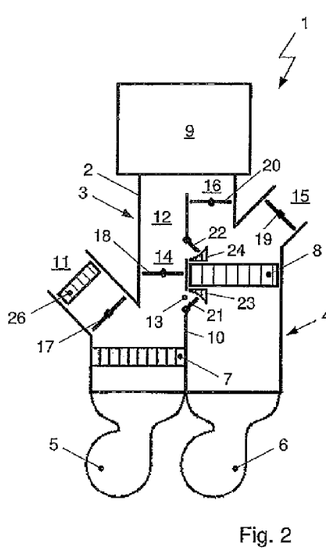
FIGS. 2, 3: show a cold air flow path of a first flow duct designed as an exhaust air duct, and a coolant-air-heat exchanger disposed in the cold air flow path.

FIG. 2 shows an air conditioning system 1 having a housing 2, including a first flow duct 3 and a second flow duct 4, wherein each flow duct 3, 4 is associated with a fan 5, 6 and may be acted upon by fresh air from the environment, circulating air from the passenger compartment 9 or a mixture of both.

An evaporator 7 is disposed in the first flow duct 3 and a condenser 8 is disposed in the second flow duct 4, wherein both are designed as components of a refrigerant circuit (not shown) of the air conditioning system 1, and as an air-impacted heat exchanger. The evaporator 7 in this configuration occupies the entire flow cross-section of the first flow duct 3. The condenser 8 is disposed so as to cover the flow duct and includes two sections. The first section is disposed within the second flow duct 4, covering the entire flow cross-section, and has a larger heat exchange surface as compared to the second section. The second section of the condenser 8 may be disposed within the first flow duct 3 or the second flow duct 4, depending on the need and the operating mode of the air conditioning system 1. The second section of the condenser 8 may then be disposed within the flow path 13 of the first flow duct 3 and in this case occupies the entire variably expanding flow cross-section of the flow path 13.

The first and the second flow ducts 3, 4 are separated from one another by a partition 10 and by two additional air deflectors 21, 22 designed as movable flaps, and by static air deflectors 23, 24 designed as air baffles.

The air deflectors 21, 22 having shapes matched to one another and the air baffles 23, 24 disposed in parallel alignment to the partition 10 form an air deflector device for the condenser 8 and are used to prevent a mixing of the air-mass flow cooled and conditioned when flowing through the evaporator 7 within the first flow duct 3, with the un-conditioned air-mass flow of the second flow duct 4.

The air baffles 23, 24 projecting into the second flow duct 4 and, therefore, disposed further away from the partition 10 are of increasing length. The further away the air baffles 23, 24 are disposed from the partition 10, the greater the length of the air baffles 23, 24, wherein the lengths of the air baffles 23, 24 disposed adjacent to one another increase in such a way that the ends of the entire assembly of the air baffles 23, 24 form two concave-shaped surfaces. Each of the surfaces is curved, uniformly, describing an arc, about an axis, which is aligned parallel to the surfaces. Each of the center points of the arcs represents the axis about which the rectangular surface is curved. The axes in this configuration correspond to the rotation axes of the movable air deflectors 21, 22. The radii of the surfaces with the arc-shaped curvature correspond to the longitudinal extension of the air deflectors 21, 22, i.e., the extension of the movable air deflectors 21, 22 in the flow direction of the air-mass flows through the flow ducts 3, 4.

The side edge of the pivotable air deflectors 21, 22 facing away from the rotation axis is aligned with the concavely curved surface extending from the ends of the air baffles 23, 24. To allow for free movement of the air deflectors 21, 22, a gap of minimal width is left between the face and the side edge of the air deflectors 21, 22, which affects the flow of the air-mass flow only negligibly or not at all.

By simultaneously rotating the air deflectors 21, 22 about the respective rotation axis in opposite directions of rotation, it is possible to adjust the portion of the section of the condenser 6 in the first flow duct 3 and in the second flow duct 4. The sections of the condenser 8 in this case may be divided essentially infinitely. The air deflectors 21, 22, after being rotated, are aligned in such a way that the side edges disposed parallel to the rotation axis and facing away from the rotation axis are situated opposite an end of an air baffle 23, 24, so that the air-mass flow is able to flow along a continuous flow surface. In intermediate positions of the air deflectors 21, 22, the leakage flows occurring in relation to the air baffle 23, 24 are negligible. An intermediate position is understood to mean a position of the air deflectors 21, 22, in which the side edges of the air deflectors 21, 22 are not situated precisely opposite an edge of the air baffles 23, 24, but rather are disposed between two baffles 23, 24.

The separately regulatable fans 5, 6 create an advantageous dynamic of the air conditioning system 1, since the first flow duct 3 including the evaporator 7 and the second flow duct 4 including the condenser 8 may be impacted by air-mass flows of different velocities, and therefore enable a rapid response to altered operating states.

The fan 5 of the first flow duct 3 guides the intake air as an air-mass flow to the evaporator 7. The air-mass flow, when flowing over the evaporator 7, is cooled and/or dehumidified.

The cold air-mass flow exiting the evaporator 7 is divided in a required proportion into a partial air-mass flow via the cold air flow path 11, also referred to as exhaust air duct 11, into the environment, and into a partial air-mass flow via the cold air flow path 12 into the passenger compartment 9, or is allocated completely to one of the cold air flow paths 11, 12. The cold air-mass flow is divided with the aid of the air deflectors 17, 18 designed as flaps.

Also disposed within the exhaust air duct 11, which is designed to divert cold air from the first flow duct 3, is a coolant-air-heat exchanger 26 of the coolant circuit (not shown). With the coolant-air-heat exchanger 26, the heat absorbed in the coolant circuit is transferred to the exhaust air and thereby discharged into the environment.

Under specific operating conditions, or depending on the operating mode, the air-mass flow conveyed via the evaporator 7 and thereby cooled is not directed or directed only partially into the passenger compartment 9, and is thus diverted at least in part or completely into the environment by way of the cold air flow path 11. The portion of cold air diverted by way of the cold air flow path 1 into the environment is directed over the coolant-air-heat exchanger 26 disposed in the exhaust air duct 11, and heat is thereby discharged from the coolant circuit. Due to the air-mass flow conveyed by the fan 5, it is possible to dispense with an additional fan for streaming air against the coolant-air-heat exchanger 26.

The fan 6, similar to the fan 5, draws in air and feeds the intake air as an air-mass flow to the condenser 8. As it flows over the condenser 8, the air-mass flow is heated.

The warm air-mass flow exiting the condenser 8 is divided in a required proportion into a partial air-mass flow via the warm air flow path 15 into the environment and into a partial air-mass flow via the warm air flow path 16 into the passenger compartment 9, or is allocated completely to one of the warm air flow paths 15, 16. The warm air-mass flow is divided with the aid of the air deflectors 19, 20 designed as flaps.

During refrigerant unit operation, i.e., when cooling the air to be supplied to the passenger compartment 9, the air deflector 18 is opened. The air deflectors 21, 22 are aligned flush with the partition 10 in such a way that the flow path 13 is closed, so that the air-mass flow passes completely by the condenser 8 and is directed by way of the cold air flow path 12 to the passenger compartment 9, whereas the cold air flow path 11 is closed. The air-mass flow directed through the first flow duct 3 is directed by the bypass duct 14 as a bypass flow around the condenser 8.

The air deflectors 19, 20 are aligned in such a way that the air-mass flow is directed by way of the warm air flow path 15 to the environment, whereas the warm air flow path 16 to the passenger compartment is closed.

The fan 5 conveys the air through the first flow duct 3 to the evaporator 7. The air is cooled and dehumidified and flows by way of the cold air flow path 12 into the passenger compartment 9. The fan 6 conveys the air in the second flow duct 4 to the condenser 8. The air is heated and passed by way of the warm air flow path 15 into the environment.

During heat pump operation, i.e., when heating the air to be supplied to the passenger compartment 9, the air deflectors 17, 20 are opened, so that the air-mass flow conveyed through the first flow duct 3 is directed by way of the cold air flow path 11 into the environment, whereas the bypass duct 14 is closed by the air deflector 18. The air deflectors 21, 22 are aligned flush with the partition 10, so that the flow path 13 is also closed.

The air-mass flow conveyed through the second flow duct 4 is directed by way of the warm air flow path 16 to the passenger compartment 9, whereas the warm air flow path 15 is closed by the air deflector 19.

The fan 5 conveys the air through the first flow duct 3 to the evaporator 7. The air is cooled and flows by way of the cold air flow path 11 into the environment. The fan 6 conveys the air through the second flow duct 4 to the condenser 8. The air is heated and passes into the passenger compartment 9 by way of the warm air flow path 16.

During reheating operation, the air deflectors 17, 18, 19, 20, 21, 22 are disposed in various positions between completely opened and completely closed, depending on the need. The air-mass flow to be heated is varied as a result of the positions of the air deflectors 17, 18, 21, 22 and the speed of the fan 5. The section of the condenser 8 disposed in the flow path 13 is useful only for the reheating operation.

The two flaps 17, 18 and 19, 20, respectively, may each be coupled by a kinematic device and may be adjusted with the aid of a single drive. Alternatively, the air deflectors 17, 18 and 19, 20 designed as flaps, may each be designed as one flap. The separate design of the flaps 17, 18, 19, 20 and the design as one common flap each relates also to the embodiment of the air conditioning system 1 described below.

Figure 3:
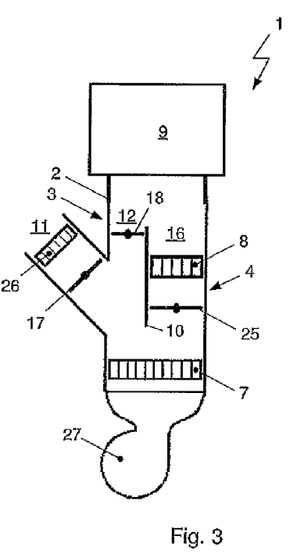

Unlike the air conditioning system 1 according to FIG. 2, the embodiment according to FIG. 3 includes only one fan 27, which conveys the air-mass flow through the first flow duct 3 as well as through the second flow duct 4. This air conditioning system 1 comprises essentially three air deflecting elements designed as air deflectors 17, 18, 25. The air deflector 25 in this configuration is used to open and close the second flow duct 4, or the warm air flow path 16. The evaporator 7 in this case occupies the entire flow cross-section of the flow duct 3, 4, so that the air conveyed by the fan 27 is directed completely over the evaporator 7 and may be subsequently apportioned, depending on the operating mode, to the flow ducts 3, 4. Evaporator 7 and condenser 8 are also referred to as internal heat exchangers due to their arrangement within the flow ducts 3, 4 and, therefore, within the housing 2.

The air-mass flow drawn in by the fan 27 and fed to the evaporator 7 is cooled and/or dehumidified when it flows over the evaporator 7.

The cold air-mass flow exiting the evaporator 7 is directed as a partial air-mass flow through the first flow duct 3 via the cold air flow path 12 in the direction of the passenger compartment 9, via the cold air flow path 11 into the environment of the air conditioning system 1 and/or through the second flow duct 4 in the direction of the passenger compartment 9. The cold air-mass flow in this case is divided into a required proportion or is allocated completely to one of the cold air flow paths 11, 12 or to the second flow duct 4. When flowing over the condenser 8, the partial air-mass flow is heated.

As in the case of the embodiment according to FIG. 2, the coolant-air-heat exchanger 26 of the coolant circuit (not shown) is disposed within the exhaust air duct 11.

The air-mass flow conveyed via the evaporator 7 and, depending on the operating mode, diverted at least partially or completely by way of the cold air flow path 11 into the environment is directed via the coolant-air-heat exchanger 26 disposed in the exhaust air duct 11, and heat is thereby discharged from the coolant circuit. Due to the air-mass flow conveyed by the fan 27, it is possible to dispense with an additional fan for streaming air against the coolant-air-heat exchanger 26.

During refrigerant unit operation, the air deflectors 17, 25 are closed. The air deflector 18 is aligned in such a way that the air-mass flow is directed by way of the cold air flow path 12 to the passenger compartment 9. The cold air flow path 12 is opened.

The fan 27 conveys the air to the evaporator 7. The air is cooled and dehumidified and flows through the first flow duct 3 by way of the cold air flow path 12 into the passenger compartment 9.

The heat absorbed by the refrigerant in the evaporator 7 is emitted in a heat exchanger (not shown) integrated in the refrigerant circuit. The heat exchanger, operated during refrigerant unit operation as a condenser, is disposed outside the housing 2 and utilizes the ambient air as a heat sink. The arrangement on the front of the vehicle makes it possible for the airstream to flow against the heat exchange surface, which improves the heat transfer process without the use of additional components, such as ventilators. The heat exchanger, because it is disposed outside the housing 2, is also referred to as an external heat exchanger.

During heat pump operation, the air deflectors 17, 18 are closed. The air deflector 25 is opened, so that the air-mass flow is directed by way of the warm air flow path 16 to the passenger compartment 9. No heat is transferred in the evaporator 7.

The heat emitted to the air by the refrigerant in the condenser 8 is absorbed in the external heat exchanger (not shown), which is connected during heat pump operation as an evaporator.

During reheating operation, the air deflectors 17, 18, 25 are disposed in various positions between completely opened and completely closed, depending on the need. The air-mass flow to be heated is varied as a result of the positions of the air deflectors 17, 18, 25 and the speed of the fan 27.

When the air deflectors 18, 25 are opened, the partial air-mass flow, reheated when flowing over the condenser 8, is mixed with the partial air-mass flow of the cold air-mass flow flowing by way of the cold air flow path 12. The partial air-mass flow through the first flow duct 3 may be regulated by adjustment of the air deflector 17. When the air deflector 17 is opened, the partial air-mass flow through the first flow duct 3 is reduced, depending on the position of the air deflector 17.

When the air deflector 18 is closed, the partial air-mass flow, reheated when flowing over the condenser 8, is directed unmixed into the passenger compartment. A portion of the cold air-mass flow, conditioned when flowing over the evaporator 7, is diverted by the opened air deflector 17 by way of the cold air flow path 11 into the environment of the air conditioning system 1.

In addition to the transfer of heat in the evaporator 7 and in the condenser 8, heat may also be transferred in the external heat exchanger (not shown), also operable as an evaporator or condenser.

In FIGS. 4 through 7, the air conditioning system 1 according to FIG. 2 or to FIG. 3 is depicted with the flow paths 30, 31, 32 disposed in the flow direction upstream from the fans 5, 6, 27 for impacting the fans 5, 6, 27 with fresh air FL and/or ambient air UL.

The flow paths 30, 31 are impacted with fresh air FL from the environment, whereas circulating air UL flows through the flow path 32. The flow paths 30, 31 are each also referred to as fresh air intake duct 30, 31 and flow path 30 is also referred to as ambient air intake duct 32.

The flow paths 30, 32 are opened, partially opened or closed with the aid of an air deflector 33 designed as a flap. The flap 33 is disposed within a mixing zone, into which the flow paths 30, 32 empty, and merge into the flow path 28 to the fan 5, 27.

Figure 4:
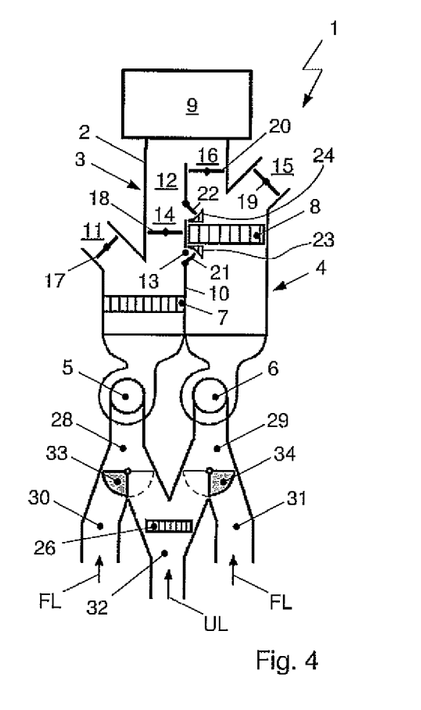
FIGS. 4, 5: show a coolant-air-heat exchanger disposed in the circulating air intake duct.
Figure 6:
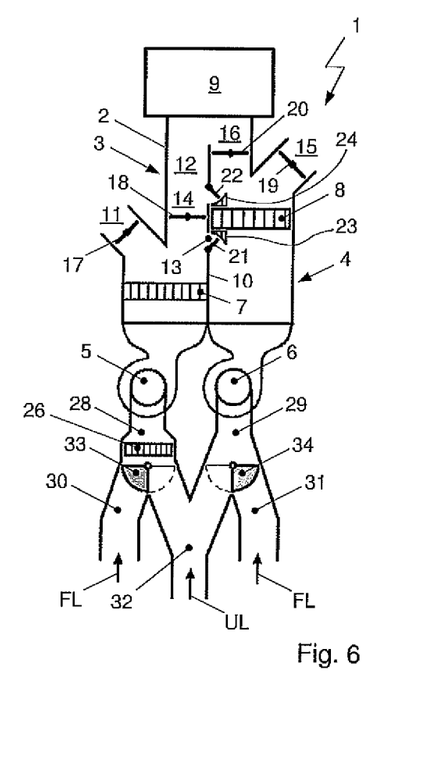
FIGS. 6, 7: show a coolant-air-heat exchanger disposed in the intake duct.

The flow path 32 disposed between the outer flow paths 30, 31 according to FIG. 4 and FIG. 6 branches into two subpaths before reaching the mixing zone, wherein the first subpath leads to the flap 33 and the second subpath leads to the air deflector 34 designed as a flap. The flap 34 is also disposed in a mixing zone, into which the flow paths 31, 32 empty and merge into the flow path 29 to the fan 6. The flap 34 is used to open, partially open or close the flow paths 31, 32.

The flow paths 28, 29, due to their function, are also referred to as intake ducts 28, 29.

The flaps 33, 34 are each disposed in such a way that circulating air UL is recycled. The flow paths 30, 31 for the fresh air FL from the environment are closed.

Figure 5:
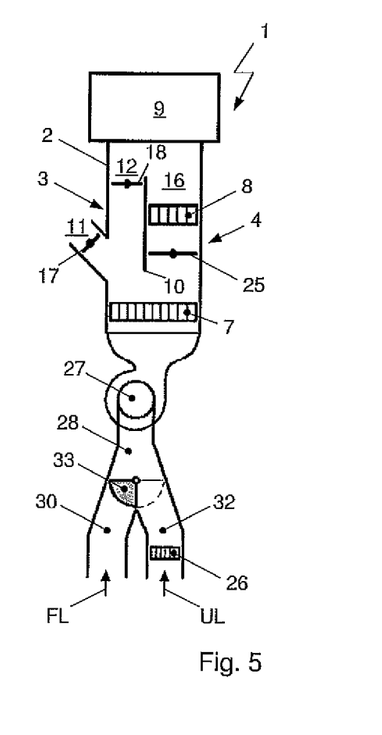

According to the embodiments of the air conditioning system 1 shown in FIG. 4 and FIG. 5, the coolant-air-heat exchanger 26 of the coolant circuit (not shown), unlike the air conditioning systems 1 according to FIG. 2 or FIG. 3, is in each case disposed not in the exhaust air duct 11, but within the flow path 32.

During circulating air operation of the air conditioning system 1, air is drawn by the fan 5, 6, 27 from the passenger compartment 9 through the circulating air duct 32. The air-mass flow drawn by fan 5, 27 is directed over the evaporator 7, cooled and/or dehumidified and, during refrigerant unit operation of the refrigerant circuit, is then fed back to the passenger compartment 9 or, during heat pump operation, is discharged through the exhaust air duct 11 into the environment. An air-mass flow drawn by fan 6 according to FIG. 4 is directed over the condenser 8, heated and during refrigerant unit operation of the refrigerant circuit, is subsequently discharged by way of the warm air flow path 15 into the environment or, during heat pump operation, is fed back to the passenger compartment 9.

The air-mass flow recirculated by the fans 5, 6, 27 may be utilized for discharging heat from the coolant circuit, since heat may be transferred from the coolant to the air-mass flow via the coolant-air-heat exchanger disposed in the circulating air intake duct 32. Since the coolant-air-heat exchanger 26 is disposed upstream from the evaporator 7 in the flow direction of the air, it is possible during the heat pump operation to utilize the waste heat of the coolant circuit via the mass flow of the circulating air UL as a heat source for the refrigerant circuit. The waste heat of the coolant circuit may also be used directly for pre-heating the incoming air for the passenger compartment 9.

According to an alternative embodiment (not shown), the coolant-air-heat exchanger 26 may also be disposed in the fresh air intake duct 31, which is of particular advantage for the refrigerant unit operation.

Figure 7:
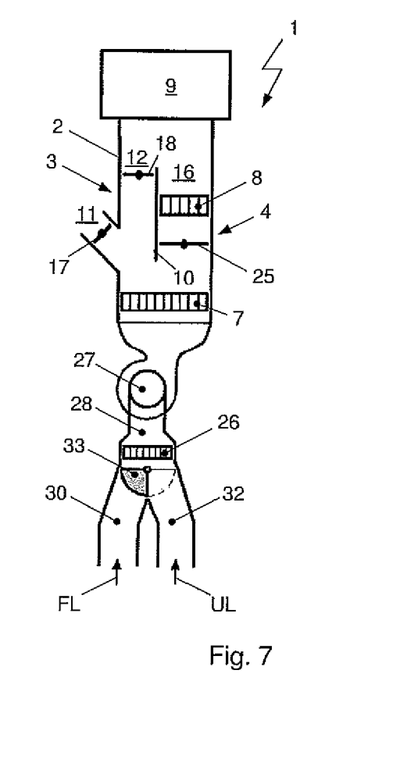

According to the embodiments of the air conditioning system 1 shown in FIG. 6 and FIG. 7, the coolant-air-heat exchanger 26 of the coolant circuit (not shown) is, unlike the air conditioning systems 1 according to FIG. 2 or FIG. 3, in each case not disposed in the exhaust air duct 11, but within the flow path 28, i.e., in the flow direction of the intake air downstream from the mixing zone, into which the flow paths 30, 32 for the fresh air FL and the circulating air UL empty.

In the purely circulating air operation as well as in the circulating air-fresh air operation of the air conditioning system 1, air is drawn by fan 5, 27 from the passenger compartment 9 through the circulating air intake duct 32. The air-mass flow drawn by the fan 5, 27 from fresh air FL, circulating air UL or a mixture of fresh air FL and circulating air UL is directed over the evaporator 7, cooled and/or dehumidified and, during refrigerant unit operation of the refrigerant circuit, then fed back to the passenger compartment 9 or, during heat pump operation, is discharged through the exhaust air duct 11 into the environment. An air-mass flow drawn from fan 6 according to FIG. 6 is directed over the condenser 8, heated and, during refrigerant unit operation of the refrigerant circuit, then discharged by way of the warm air flow path 15 into the environment or, during heat pump operation, fed back to the passenger compartment 9.

The air-mass flow drawn by the fans 5, 27 may be utilized for discharging heat from the coolant circuit, since heat from the coolant may be transferred to the air-mass flow via the coolant-air-heat exchanger 26 disposed in the circulating air intake duct 32. Since the coolant-air-heat exchanger 26 is disposed upstream from the evaporator 7 in the flow direction of the air, the waste heat of the coolant circuit may, via the mass flow of the circulating air UL, be used as a heat source for the coolant circuit during the heat pump operation. The waste heat of the coolant circuit may also be directly utilized for pre-heating the incoming air for the passenger compartment 9.

LIST OF REFERENCE NUMERALS

1 Air conditioning system
2 Housing
3 First flow duct
4 Second flow duct
5, 6 Fan
7 Evaporator
8 Condenser
9 Passenger compartment
10 Partition
11 Cold air flow path, exhaust air duct
12 Cold air flow path
13 Flow path in the first flow duct 3
14 Bypass duct in the first flow duct 3
15, 16 Warm air flow path
17 Air deflector/flap of the cold air for cold air flow path 11
18 Air deflector/flap for bypass duct 14
19, 20 Air deflector/flap of the warm air flow path 15, 16
21, 22 Air deflector/flap between the flow ducts 3, 4 for streaming air to/away from condenser 8—inlet/outlet flow path 13
23, 24 Static air deflectors, air baffles
25 Air deflector/flap at the inlet to the warm air flow path 16
26 Coolant-air-heat exchanger
27 Fan
28, 29 Flow path, intake duct
30, 31 Flow path, fresh air intake duct
32 Flow path, circulating air intake duct
33, 34 Air deflector/flap
FL Fresh air
UL Circulating air

The invention claimed is:

1. An air conditioning system for conditioning air of a passenger compartment of a motor vehicle comprising:
a housing including a first flow path, a first flow duct, and a second flow duct, the first flow duct including a first fan and the second flow duct including a second fan, the first fan and the second fan configured to convey air through the housing;
a refrigerant circuit including an evaporator disposed in the first flow duct and a condenser disposed in the second flow duct;
an outlet section in fluid communication with the housing and configured to receive at least a portion of the air flowing through the housing and convey the portion of the air to the environment; and
a coolant-air-heat exchanger disposed in the first flow path, the coolant-air-heat exchanger configured to provide heat exchange communication between the air flowing through the first flow path and a coolant flowing through a coolant circuit of the motor vehicle, the coolant circuit configured to temper components of the motor vehicle, wherein the coolant-air-heat exchanger is disposed upstream from the first fan and the second fan with respect to a direction of a flow of the air through the housing.

2. The air conditioning system of claim 1, wherein the first fan is configured to convey the air through the first flow duct and the second fan is configured to convey the air through the second flow duct.

3. The air conditioning system of claim 1, wherein the outlet section is configured as an exhaust air duct formed in the housing.

4. The air conditioning system of claim 1, wherein the outlet section includes an air deflector disposed therein, the air deflector selectively opening and closing the outlet section.

5. An air conditioning system for conditioning the air of a passenger compartment of a motor vehicle comprising:
a housing having a first flow path, a first flow duct, and a second flow duct, the first flow duct including a first fan and the second flow duct including a second fan, the first fan and the second fan configured to convey air through the housing;
a refrigerant circuit including an evaporator disposed in the first flow duct and a condenser disposed in the second flow duct; and
a coolant-air-heat exchanger disposed in the first flow path, the coolant-air-heat exchanger configured to provide heat exchange communication between the air and a coolant flowing through a coolant circuit of the motor vehicle, the coolant circuit configured to temper components of the motor vehicle, wherein the coolant-air-heat exchanger is disposed upstream from the first fan and the second fan with respect to a direction of a flow of the air through the housing.

6. The air conditioning system of claim 5, wherein the first flow path includes a first fresh intake duct, a second fresh intake duct, and a circulating air intake duct formed therein, each of the first fresh intake duct, the second fresh intake duct, and the circulating air intake duct configured to convey the air therethrough, the first fresh intake duct and the second fresh intake duct receiving the air from the environment, and the circulating air duct receiving the air from the passenger compartment of the motor vehicle.

7. The air conditioning system of claim 6, wherein the coolant-air-heat exchanger is disposed in the circulating air intake duct.

8. The air conditioning system of claim 5, wherein the air conditioning system is configured for a refrigerant unit operation, a heat pump operation, and a reheating operation of the passenger compartment of the motor vehicle.

9. The air conditioning system of claim 5, wherein each of the first flow duct and the second flow duct receive the air from at least one of the environment and the passenger compartment.

10. The air conditioning system of claim 5, wherein the second fan is independently operable from the first fan, the first fan conveying the air through the first flow duct and the second fan conveying the air through the second flow duct.

11. The air conditioning system of claim 5, wherein the housing includes a partition disposed therein, the partition separating the first flow duct from the second flow duct.

12. The air conditioning system of claim 11, wherein a flow path is formed through the partition and provides fluid communication between the first flow duct and a portion of the condenser.

13. The air conditioning system of claim 12, wherein the flow path includes a pair of air baffles and a pair of air deflectors, the pair of air baffles cooperating with the pair of air deflectors to guide the air flowing through the first flow duct through the portion of the condenser.

14. The air conditioning system of claim 1, wherein the housing includes a second flow path and a third flow path, the second flow path defined by a first fresh air intake duct, the third flow path defined by a second fresh air intake duct, and the first flow path defined by a circulating air intake duct, each of the first fresh air intake duct, the second fresh air intake duct, and the circulating air intake duct configured to convey the air therethrough, the first air fresh intake duct and the second fresh air intake duct receiving the air from the environment, and the circulating air duct receiving the air from the passenger compartment of the motor vehicle, wherein the coolant-air-heat exchanger is disposed in the circulating air intake duct.

15. The air conditioning system of claim 14, wherein the circulating air duct branches into a first subpath and a second subpath, the first subpath and the first fresh air intake duct converging into a first fan flow path, and the second subpath and the second fresh air intake duct converging into a second fan flow path.

16. The air conditioning system of claim 15, wherein a first mixing zone is formed at a convergence of the first subpath with the first fresh air intake duct and the circulating air intake duct, wherein a second mixing zone is formed at a convergence of the second subpath with the second fresh air intake duct and the circulating air intake duct, and wherein a first flap is disposed in the first mixing zone and a second flap is disposed in the second mixing zone.

* * * * *